United States Patent
Nishiura et al.

(10) Patent No.: US 8,783,401 B2
(45) Date of Patent: Jul. 22, 2014

(54) SADDLE RIDING TYPE, ELECTRIC VEHICLE

(75) Inventors: Hisao Nishiura, Wako (JP); Kazumi Shibata, Wako (JP); Tomohiro Tsukamoto, Wako (JP); Takashi Tominaga, Wako (JP); Susumu Akutsu, Sayama (JP)

(73) Assignee: Honda Motor Co., Ltd., Tokyo (JP)

( * ) Notice: Subject to any disclaimer, the term of this patent is extended or adjusted under 35 U.S.C. 154(b) by 373 days.

(21) Appl. No.: 13/110,481

(22) Filed: May 18, 2011

(65) Prior Publication Data

US 2011/0290578 A1    Dec. 1, 2011

(30) Foreign Application Priority Data

May 28, 2010 (JP) .................. 2010-122326
May 28, 2010 (JP) .................. 2010-122327

(51) Int. Cl.
*B60R 16/04* (2006.01)

(52) U.S. Cl.
USPC .................. 180/68.5; 180/206.1; 180/206.2; 180/206.5; 180/220; 180/65.51

(58) Field of Classification Search
USPC ........ 180/206.1, 206.2, 206.5, 218, 219, 220, 180/226, 227, 228
See application file for complete search history.

(56) References Cited

U.S. PATENT DOCUMENTS

2009/0020348 A1 *    1/2009    Horii et al. ................ 180/65.3

FOREIGN PATENT DOCUMENTS

| JP | 2005-231423 A | | 9/2005 |
| JP | 2008-221976 A | | 9/2008 |
| JP | 2008221976 A | * | 9/2008 |

* cited by examiner

*Primary Examiner* — Hau Phan
*Assistant Examiner* — Bryan Evans
(74) *Attorney, Agent, or Firm* — Birch, Stewart, Kolasch & Birch, LLP

(57) ABSTRACT

A saddle riding type, electric vehicle includes a swing arm removably and vertically swingably supported on a vehicle body frame, and an electric motor, a battery for supplying the electric motor with electric power, and a control unit for controlling the electric motor. The electric motor, the battery, and the control unit are disposed on the swing arm. The swing arm integrally provides, forwardly of a rear wheel, a bulkhead for accommodating a battery in isolation from an electric motor and a control unit. The bulkhead has an opening portion that faces terminals disposed on the battery. A battery accommodating portion integrally provides a partition wall extending in a vehicle width direction to form a plurality of accommodating chambers with each containing one of a plurality of batteries. A stand disposed downwardly of the partition wall is supported rotatably on a bottom wall of the battery accommodating portion.

18 Claims, 4 Drawing Sheets

SADDLE RIDING TYPE, ELECTRIC VEHICLE

CROSS-REFERENCE TO RELATED APPLICATIONS

The present application claims priority under 35 USC 119 to Japanese Patent Application No. 2010-122326 filed on May 28, 2010 and Japanese Patent Application No. 2010-122327 filed on May 28, 2010 the entire contents of which are hereby incorporated by reference.

BACKGROUND OF THE INVENTION

1. Field of the Invention

The present invention relates to a saddle riding type, electric vehicle that includes a swing arm removably and vertically swingably supported on a vehicle body frame, and an electric motor, a battery, and a control unit disposed on the swing arm. The electric motor for generating a drive power for rotatably driving a rear wheel rotatably is supported at a rear portion of the swing arm together with the battery for supplying the electric motor with an electric power, and the control unit for controlling the electric motor. The present invention is also directed to a stand for the vehicle.

2. Description of Background Art

Japanese Patent Laid-open No. 2008-221976 discloses a motorcycle that uses electric power supplied from a battery to operate an electric motor, thereby driving a rear wheel with a driving force generated by the electric motor.

The motorcycle disclosed in Japanese Patent Laid-open No. 2008-221976 has electrical parts for a drive system disposed as a unit on a swing arm. While offering an advantage of simplified serviceability and wiring, the arrangement disposes a battery, an electric motor, and a control unit that are relatively heavy on the swing arm. This tends to require that the swing arm have an increased wall thickness for greater rigidity, resulting in an increase in the weight of the swing arm.

In addition, in such a saddle riding type, electric vehicle, a need exists for a stand for holding the vehicle in a standing position disposed on the swing arm. However, a stand is not mentioned in Japanese Patent Laid-open No. 2008-221976. Disposing a main stand in the swing arm requires consideration of enhancing the rigidity of a portion for supporting the main stand. This can lead to a further increase in the weight of the swing arm that is already relatively heavy.

SUMMARY AND OBJECTS OF THE INVENTION

The present invention has been made in view of the foregoing situation and it is an object of an embodiment of the present invention to provide a saddle riding type, electric vehicle that permits a lighter swing arm, while maintaining good maintainability and simplified wiring.

To achieve the foregoing object, according to an embodiment of the present invention, a saddle riding type, electric vehicle includes a swing arm removably and vertically swingably supported on a vehicle body frame; an electric motor, disposed in the swing arm, for generating a drive power for rotatably driving a rear wheel rotatably supported at a rear portion of the swing arm; a battery, disposed in the swing arm, for supplying the electric motor with electric power; and a control unit, disposed in the swing arm, for controlling the electric motor. In this electric vehicle, the swing arm integrally provides, forwardly of the rear wheel, a bulkhead for disposing the battery in isolation from the electric motor and the control unit; and the bulkhead has an opening portion facing terminals disposed in the battery.

According to an embodiment of the present invention, the opening portion is disposed on an upper portion or a lower portion of the bulkhead.

According to an embodiment of the present invention, the swing arm includes a battery accommodating portion 33 having the bulkhead 53a forming part of an outer periphery thereof; and an arm portion 34 having the bulkhead 53a as part of constituent elements thereof, the arm portion 34 extending from a first crosswise end portion EP of the battery accommodating portion 33 to a first crosswise side Ls of the arm portion 34 disposed further leftwardly with respect to the rear wheel WR; the control unit 8 is disposed on an outer surface of the arm portion 34 so as to overlap part of the battery 7 in a side view; and the arm portion 34 is removably fitted with a cover member 38 for covering from an outside the arm portion 34 and the control unit 8 disposed on the arm portion 34.

According to an embodiment of the present invention, the battery includes a plurality of batteries, each being disposed individually in a corresponding one of a plurality of accommodating chambers defined by a partition wall integrally formed with the battery accommodating portion; and the bulkhead has the opening portion such that the opening portion communicates individually with each of the accommodating chambers.

According to an embodiment of the present invention, the battery accommodating portion formed to be open upwardly is removably fitted with a lid member for covering the battery accommodating portion from an upward direction so as to contact with the battery in the battery accommodating portion.

According to an embodiment of the present invention, the electric motor is disposed on a first crosswise side of a vehicle body centerline extending longitudinally. The battery is disposed on a second crosswise side of the vehicle body centerline such that part thereof is disposed sideways the rear wheel.

A high-voltage battery 7 of an embodiment of the present invention corresponds to the battery of the present invention and a front portion cover 38 of the embodiment of the present invention corresponds to the cover member of the present invention.

According to an embodiment of the present invention, disposing the electric motor, the battery, and the control unit in the swing arm allows a power unit including the electric motor to be assembled in advance before mounting onto the vehicle body frame, thereby enhancing assemblability. The foregoing arrangement also improves maintainability and achieves simplified wiring. The bulkhead for disposing the battery in isolation from the electric motor and the control unit is integrally formed with the swing arm forwardly of the rear wheel. The bulkhead not only enhances rigidity of the swing arm without having to provide a special member for enhancing rigidity, but also reduces the number of members disposed for supporting the battery. Though the presence of the bulkhead may impede wiring from being simplified, the bulkhead has the opening portion that faces the terminals disposed in the battery, so that effect of the bulkhead on simplification of the wiring can be minimized.

According to an embodiment of the present invention, the opening portion is disposed at an upper or lower portion of the bulkhead. This minimizes the effect on arranging the very bulkhead or members disposed near the bulkhead.

According to an embodiment of the present invention, the swing arm includes the battery accommodating portion 33 having the bulkhead forming part of an outer periphery thereof. The arm portion 34 extends from a first crosswise end portion EP of the battery accommodating portion 33 to a first crosswise side Ls of the arm portion 34 disposed further leftwardly with respect to the rear wheel WR. The control unit 8 is mounted on the outer surface of the arm portion 34 that includes the bulkhead 53a as a constituent element thereof, so as to overlap part of the battery in a side view. This helps shorten the distance between the battery 7 and the control unit 8. The cover member 38 that covers the arm portion 34 and the control unit 8 from the outside is removably mounted on the arm portion 34. This allows the cover member 38 to be removed during servicing without worrying about wiring. With the cover member 38 removed, the control unit 8 is exposed to the outside, which further enhances maintainability.

According to an embodiment of the present invention, each of the plurality of batteries is disposed individually in a corresponding one of the plurality of accommodating chambers defined by the partition wall which is integrally formed with the battery accommodating portion. While a large amount of electric power is ensured, rigidity of the swing arm can be enhanced by the partition wall. The bulkhead has the opening portion such that the opening portion communicates with each of the accommodating chambers. This enhances ease of routing between the batteries and the control unit.

According to an embodiment of the present invention, the lid member that covers the battery accommodating portion from an upward direction is removably attached to the battery accommodating portion formed to be open upwardly, so as to contact with the battery in the battery accommodating portion. This enhances maintainability of the battery, while reducing the number of parts used exclusively for supporting the battery.

According to an embodiment of the present invention, the electric motor is disposed on a first crosswise side of the vehicle body centerline and the battery is disposed on a second crosswise side of the vehicle body centerline. Disposing the heavy electric motor and the battery on either side of the vehicle body centerline helps achieve a good crosswise weight balance. Moreover, part of the battery is disposed sideways the rear wheel. This eliminates the need for disposing the rear wheel further rearwardly in order to avoid interference with the battery. This helps avoid a long longitudinal length of the saddle riding type, electric vehicle.

Further with regard to providing a stand, the present invention has been made to provide a saddle riding type, electric vehicle wherein the weight of the swing arm having an electric motor, a battery, and a control unit disposed thereon does not increase when a stand is disposed on the swing arm.

According to an embodiment of the present invention, a saddle riding type, electric vehicle includes a swing arm 9B removably and vertically swingably supported on a vehicle body frame; an electric motor 6, disposed in the swing arm 9B, for generating a drive power for rotatably driving a rear wheel WR rotatably supported at a rear portion of the swing arm 9B; at least one battery 7, disposed in the swing arm 9B, for supplying the electric motor 6 with electric power, the at least one battery 7 including a plurality of batteries 7, 7; and a control unit 8, disposed in the swing arm 9B, for controlling the electric motor 6. In this electric vehicle, the swing arm 9B includes a battery accommodating portion 84 disposed forwardly of the rear wheel WR so as to accommodate the battery 7. In addition, arm portion 84 extends from a first crosswise end portion EP of the battery accommodating portion 84 to a first crosswise side side Ls of the arm portion 84 disposed further leftwardly with respect to the of the rear wheel. The battery accommodating portion integrally provides a partition wall extending in a vehicle width direction so as to form a plurality of accommodating chambers, each accommodating individually a corresponding one of the plurality of batteries 7, 7. A stand 10 is disposed downwardly of the partition wall 57 and supported rotatably on a bottom wall of the battery accommodating portion 84.

According to an embodiment of the present invention, the bottom wall of the battery accommodating portion further includes a bracket integrally formed therewith so as to protrude downwardly from a lower surface of the bottom wall, the bracket extending longitudinally to cross the partition wall in a plan view so as to rotatably support the stand.

According to an embodiment of the present invention, the bottom wall of the battery accommodating portion further includes a stopper integrally formed therewith, the stopper contacting with the stand to thereby maintain the stand in a standing position and extends in the vehicle width direction at a position forward of the partition wall so as to protrude downwardly from the lower surface of the bottom wall.

According to an embodiment of the present invention, the bottom wall of the battery accommodating portion further includes a plurality of ribs integrally formed on an upper surface thereof to protrude upwardly. The ribs disposed forwardly of the partition wall being more in number than the ribs disposed rearwardly thereof.

According to an embodiment of the present invention, the bottom wall of the battery accommodating portion further includes a support boss integrally formed therewith, the support boss for removably and vertically swingably supporting the swing arm on the vehicle body frame via a linkage mechanism, the support boss protruding downwardly from the lower surface of the bottom wall.

According to an embodiment of the present invention, the electric motor is disposed on a first crosswise side of a vehicle body centerline extending longitudinally and the plurality of batteries accommodated in the battery accommodating portion have individual center-of-gravity positions (G1, G2) disposed on a second crosswise side of the vehicle body centerline.

A high-voltage battery 7 of an embodiment of the present invention corresponds to the battery of the present invention, a main stand 10 of the embodiment of the present invention corresponds to the stand of the present invention, and a second bracket 66 of the embodiment corresponds to the bracket of the present invention.

According to an embodiment of the present invention, disposing the electric motor, the battery, and the control unit in the swing arm improves maintainability and achieves simplified wiring. In addition, the battery accommodating portion integrally provides the partition wall that extends in the vehicle width direction so as to define the plurality of accommodating chambers, each accommodating individually a corresponding one of the plurality of batteries. The stand disposed downwardly of the partition wall is supported rotatably on the bottom wall of the battery accommodating portion. The stand is therefore supported at a portion, rigidity of which is enhanced by the partition wall integrally formed. This eliminates the need for a member dedicated to enhancing rigidity and allows supporting rigidity of the stand to be enhanced, while inhibiting the battery accommodating portion from becoming heavier.

According to an embodiment of the present invention, the bracket for rotatably supporting the stand is integrally formed on the bottom wall of the battery accommodating portion so as to protrude downwardly from the lower surface of the bottom wall and to extend longitudinally to cross the partition wall in a plan view. This further enhances rigidity of the portion for rotatably supporting the stand.

According to an embodiment of the present invention, the stopper integrally formed on the bottom wall so as to protrude downwardly from the lower surface of the bottom wall and so as to extend in the vehicle width direction at a position forward of the partition wall contacts with the stand to thereby maintain the stand in a standing position. This enhances even further rigidity of the portion for rotatably supporting the stand.

According to an embodiment of the present invention, the plurality of ribs are integrally formed on the bottom wall so as to protrude upwardly from the upper surface thereof and the ribs disposed forwardly of the partition wall is more in number than the ribs disposed rearwardly thereof. The increased number of ribs enhances rigidity of only a portion of the bottom wall requiring greater rigidity because of the presence of the stopper, so that increased weight more than necessary can be avoided.

According to an embodiment of the present invention, the support boss for removably and vertically swingably supporting the swing arm on the vehicle body frame via the linkage mechanism is integrally formed on the bottom wall of the battery accommodating portion. This further enhances rigidity of the portion for rotatably supporting the stand.

According to an embodiment of the present invention, the heavy electric motor and the center-of-gravity positions of the plurality of heavy batteries are disposed at different locations across the vehicle body centerline. This achieves a good crosswise weight balance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Specific embodiments to which the present invention is applied will be described below with reference to the accompanying drawings.

Figure 1:
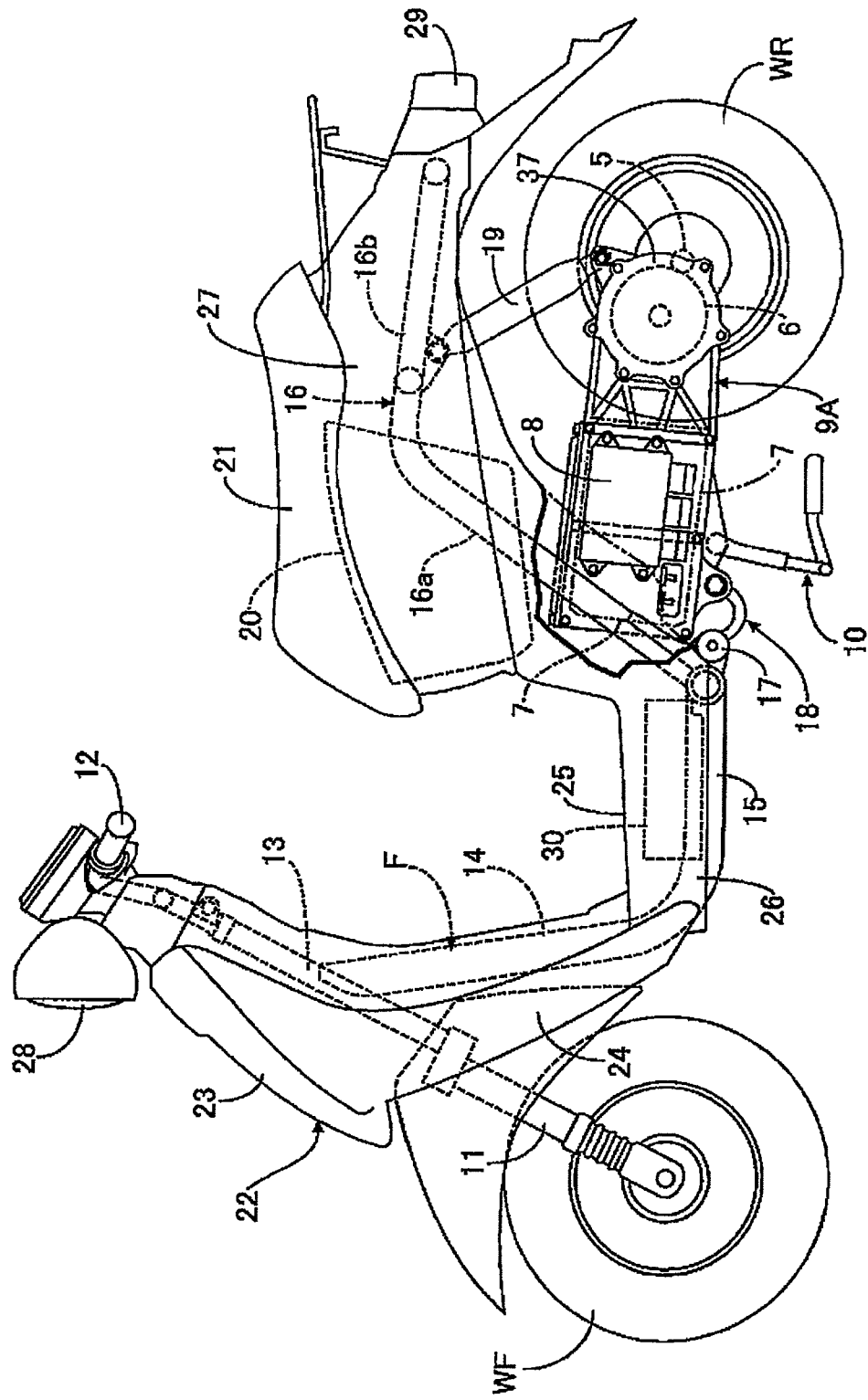
FIG. 1 is a side elevational view showing an electric drive motorcycle according to a first embodiment of the present invention.

A first embodiment of the present invention will be described below with reference to FIGS. 1 to 3. Referring to FIG. 1, a motorcycle as a saddle riding type, electric motor vehicle is a scooter type motorcycle having a low floor 25.

The motorcycle includes an electric motor 6, high-voltage batteries 7 . . . , and a control unit 8, all disposed in a swing arm 9A. The motorcycle further includes a main stand 10. More specifically, the electric motor 6 generates a drive power for rotatably driving an axle 5 of a rear wheel WR. The high-voltage, for example, 72-V batteries 7 supply the electric motor 6 with an electric power. The control unit 8 controls the electric motor 6. The swing arm 9A has a rear portion journaling the axle 5 of the rear wheel WR. The main stand 10 is rotatably supported on a lower portion on a front side of the swing arm 9A.

The motorcycle includes a vehicle body frame F that is formed to include a head pipe 13, a down frame 14, a pair of left and right under frames 15 . . . , and a pair of left and right rear frames 16 . . . . More specifically, the head pipe 13 steerably and removably supports a front fork 11 that journals a front wheel WF and a steering handlebar 12 connected to an upper portion of the front fork 11. The down frame 14 extends downwardly toward the rear from the head pipe 13. The under frames 15 . . . have front ends fixed to both sides of a lower portion of the down frame 14 and extend rearwardly. The rear frames 16 . . . are integrally joined to rear ends of the under frames 15 . . . . The rear frame 16 includes a front inclined portion 16a and a rear inclined portion 16b. More specifically, the front inclined portion 16a extends upwardly toward the rear from a rear end of the under frame 15 and the rear inclined portion 16b extends downwardly toward the rear from a rear end of the front inclined portion 16a. The two rear frames 16 . . . have rear portions connected to each other.

First brackets 17 . . . are disposed at lower end portions of the front inclined portions 16a . . . in the rear frames 16 . . . . The swing arm 9A has a front portion removably and vertically swingably supported on the first brackets 17 . . . via a linkage mechanism 18. The axle 5 of the rear wheel WR disposed on the right side at a rear portion of the swing arm 9A is rotatably supported at the rear portion of the swing arm 9A. In addition, a rear shock absorber 19 is disposed between a rear portion of the left rear frame 16 of the two rear frames 16 . . . and the rear portion of the swing arm 9A.

A storage box 20 is disposed upwardly of the swing arm 9A so as to be supported on the two rear frames 16 . . . . The storage box 20 is covered in a tandem occupant seat 21 that is supported rotatably at a front portion of the storage box 20.

The vehicle body frame F is covered in a vehicle body cover 22 formed of a synthetic resin. The vehicle body cover 22 includes a front cover 23, a leg shield 24, a low floor 25, a pair of left and right floor side covers 26 . . . , and a side cover 27. More specifically, the front cover 23 covers the head pipe 13 from a forward direction. The leg shield 24 is joined to the front cover 23 so as to cover forwardly legs of an occupant sitting on the occupant seat 21. The low floor 25 is joined to a lower portion of the leg shield 24 so that the occupant sitting on the occupant seat 21 may rest his or her feet thereon. The floor side covers 26 . . . droop from both sides of the low floor 25 so as to cover upper portions of the under frames 15 . . . from both sides. The side cover 27 is joined to the low floor 25 and the two floor side covers 26 . . . to thereby cover a vehicle body rear portion and the storage box 20 from a forward direction and both sides.

A low-voltage battery 30 for supplying auxiliaries including a headlamp 28 and a tail lamp 29 with a low voltage, e.g., a 12-V power is supported between the two under frames 15 . . . . The low-voltage battery 30 is covered in the low floor 25 and the floor side covers 26 . . . from an upward direction and both sides.

Figure 2:
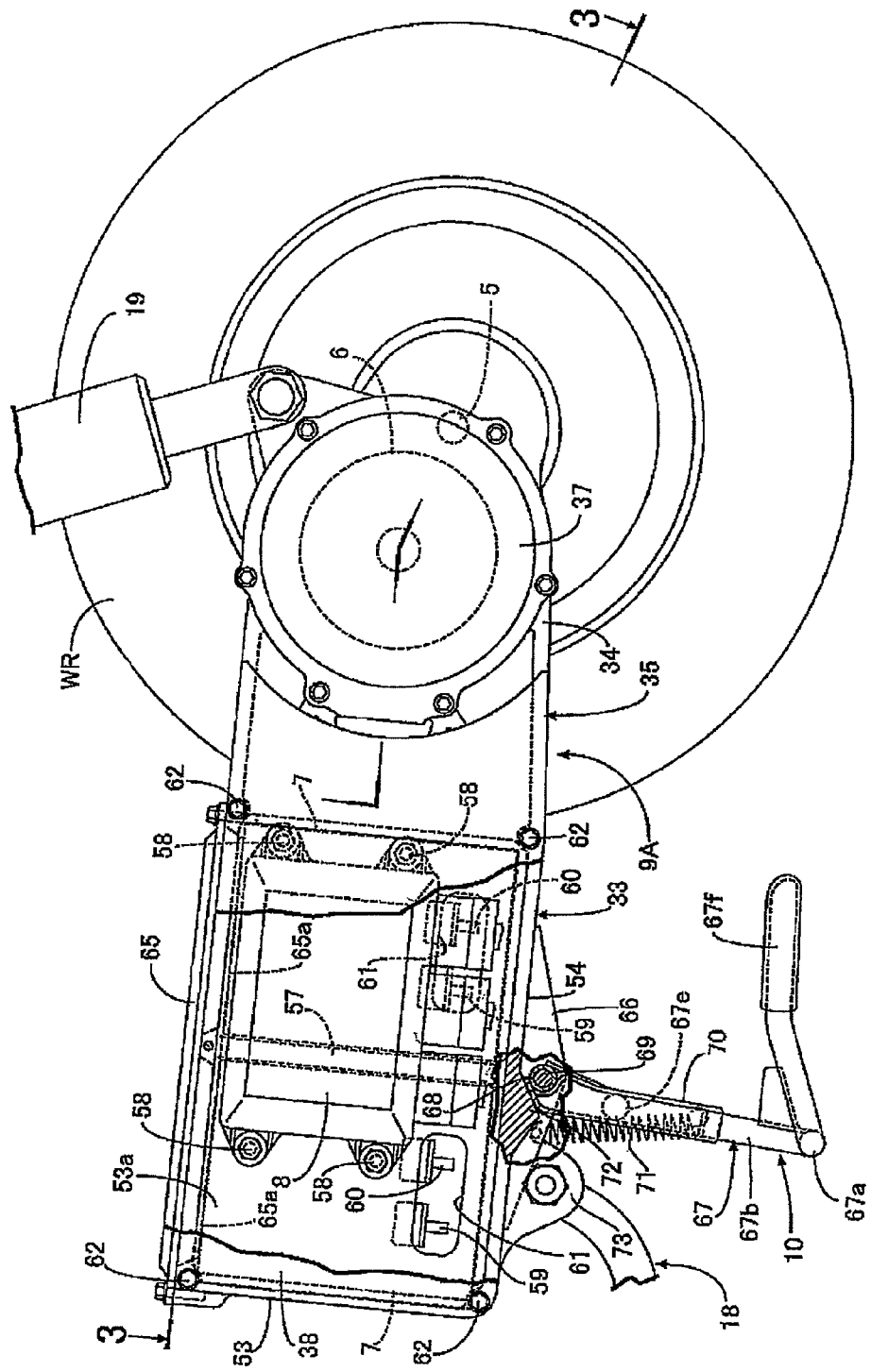
FIG. 2 is an enlarged view showing a principal section of the motorcycle shown in FIG. 1.
Figure 3:
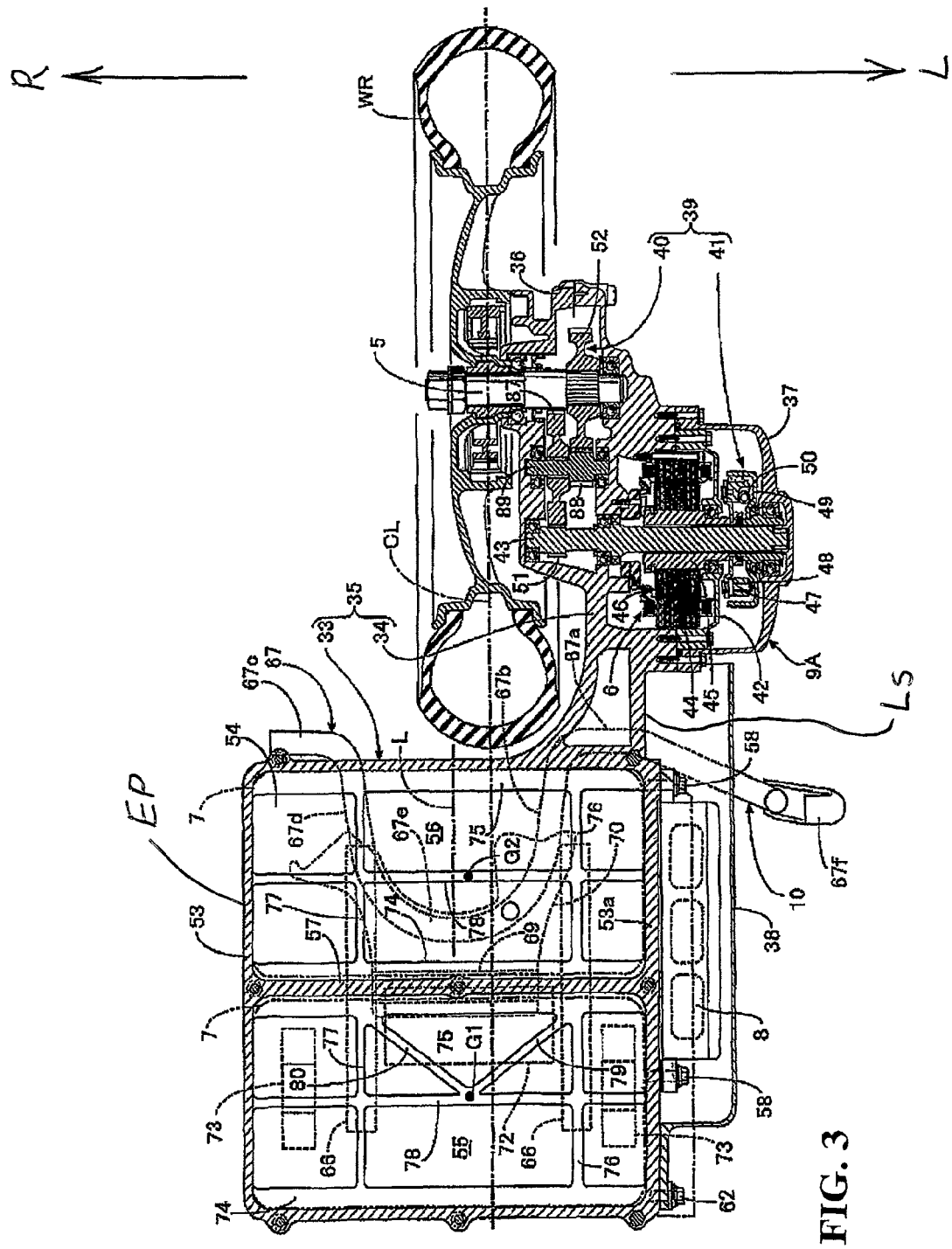
FIG. 3 is a cross-sectional view taken along line 3-3 of FIG. 2, with a main stand rotated into a stowed position.

Referring also to FIGS. 2 and 3, the swing arm 9A generally includes a swing arm main unit 35, a gear case 36, a rear portion cover 37, and a front portion cover 38. More specifically, the swing arm main unit 35 includes a battery accommodating portion 33 disposed forwardly of the rear wheel WR and an arm portion 34 that is extended from either end portion in a crosswise direction of the battery accommodating portion 33 to a first side of left and right sides of the rear wheel WR. The gear case 36 is connected to a rear portion of the arm portion 34 from the side of the rear wheel WR. The rear portion cover 37 is connected to the rear portion of the arm portion 34 from a side opposite to the rear wheel WR. The front portion cover 38 is connected to a front portion of the arm portion 34 forwardly of the rear portion cover 37 from a side opposite to the battery accommodating portion 33. In the first embodiment of the present invention, the arm portion 34 extends from a left end portion of the battery accommodating portion 33 to a left side of the rear wheel WR.

The axle 5 of the rear wheel WR is rotatably supported on the rear portion of the swing arm 9A. In addition, the electric motor 6 and power transmission means 39 that transmits the drive power from the electric motor 6 to the axle 5 are housed in the rear portion of the swing arm 9A. The power transmission means 39 includes a reduction gear train 40 and a centrifugal clutch 41. The reduction gear train 40 is inserted between the electric motor 6 and the axle 5. The centrifugal clutch 41 is inserted between the electric motor 6 and the reduction gear train 40.

The electric motor 6 is accommodated between the rear portion of the arm portion 34 in the swing arm 9A and a motor cover 42 disposed inwardly of the rear portion cover 37 and connected to the rear portion of the arm portion 34. The reduction gear train 40 is accommodated between the rear portion of the arm portion 34 and the gear case 36. The centrifugal clutch 41 is disposed between the motor cover 42 and the rear portion cover 37 and accommodated in the rear portion of the swing arm 9A.

The axle 5 of the rear wheel WR penetrates through a rear portion of the gear case 36 rotatably and airtightly and is removably and rotatably supported by the gear case 36 and the arm portion 34. A transmission shaft 43 having an axis extending in parallel with the axle 5 is disposed forwardly of the axle 5 so as to penetrate through the arm portion 34 airtightly and rotatably. The transmission shaft 43 has both end portions removably and rotatably supported on the gear case 36 and the rear portion cover 37. In addition, the transmission shaft 43 has an intermediate portion removably and rotatably supported at the arm portion 34.

The electric motor 6 generally includes a stator 44 and a rotor 46. More specifically, the stator 44 is fixed to the arm portion 34. The rotor 46 is fixed to a tubular motor shaft 45 that concentrically surrounds the transmission shaft 43 and disposed concentrically in the stator 44. The motor shaft 45 is removably and rotatably supported by the motor cover 42 and removably and relatively rotatably supported on the transmission shaft 43.

The centrifugal clutch 41 generally includes a drive plate 47, a plurality of centrifugal weights 48 . . . , a cup-shaped clutch outer 49, and clutch springs 50 . . . . More specifically, the drive plate 47 is fixed to the motor shaft 45. The centrifugal weights 48 . . . are supported at a plurality of positions of the drive plate 47. The centrifugal weights 48 . . . frictionally engage the clutch outer 49. The clutch springs 50 . . . are disposed between the centrifugal weights 48 . . . and the drive plate 47. The clutch outer 49 is fixed to the transmission shaft 43.

The centrifugal clutch 41 establishes a power transmission state between the motor shaft 45 and the transmission shaft 43 as follows. More specifically, a centrifugal force acts on each of the centrifugal weights 48 . . . as the motor shaft 45 and the drive plate 47 rotate. When the centrifugal force becomes more than a spring urging force of each of the clutch springs 50 . . . , the centrifugal weights 48 . . . frictionally engage an inner periphery of the clutch outer 49, which establishes the power transmission state between the motor shaft 45 and the transmission shaft 43.

The reduction gear train 40 generally includes a drive gear 51, a first idle gear 87, a second idle gear 88, and a driven gear 52. More specifically, the drive gear 51 is fixedly mounted on the transmission shaft 43. The first idle gear 87 meshes with the drive gear 51. The second idle gear 88 rotates with the first idle gear 87. The driven gear 52 is fixed to the axle 5 and meshes with the drive gear 51. An idle shaft 89 on which the first idle gear 87 and the second idle gear 88 are fixedly mounted is disposed to extend between and in parallel with the axle 5 and the transmission shaft 43. The idle shaft 89 has both end portions removably and rotatably supported by the arm portion 34 and the gear case 36.

The battery accommodating portion 33 is formed into an upwardly open box shape generally having a side wall 53 and a bottom wall 54. More specifically, the side wall 53 has a rectangular shape in order to accommodate the high-voltage batteries 7 . . . disposed forwardly of the rear wheel WR in isolation from the electric motor 6 and the control unit 8. The bottom wall 54 is integrally formed in a linked manner with a lower portion of the side wall 53. Of the side wall 53, the left portion functions as a bulkhead 53a for disposing the high-voltage batteries 7 . . . in isolation from the electric motor 6 and the control unit 8. The bulkhead 53a is integrally formed with the swing arm 9A at a position forward of the rear wheel WR. Additionally, the arm portion 34 includes, as part of constituent elements thereof, the bulkhead 53a that is the left portion of the side wall 53 and extends rearwardly from the battery accommodating portion 33.

The battery accommodating portion 33 has a partition wall 57 integrally formed therewith. The partition wall 57 divides an inside of the battery accommodating portion 33 into a plurality of accommodating chambers. In the first embodiment of the present invention, the partition wall 57 divides the inside of the battery accommodating portion 33 into first and second accommodating chambers 55, 56 disposed at front and rear in a longitudinal direction; the partition wall 57 is integrally formed with the battery accommodating portion 33 so as to extend in a vehicle width direction at a longitudinally intermediate portion of the battery accommodating portion 33. A high-voltage battery 7 is disposed in each of the first and second accommodating chambers 55, 56 so as to extend in the vehicle width direction.

Whereas the electric motor 6 is disposed on a first crosswise side Ls of the arm portion 34 (left side in the first embodiment of the present invention), and on a first crosswire side L of a vehicle body centerline CL extending longitudinally, the high-voltage batteries 7 . . . disposed in the first and second accommodating chambers 55, 56 formed in the battery accommodating portion 33 have center-of-gravity positions G1, G2 that are disposed on a second crosswise side R (right side in the first embodiment of the present invention) of the vehicle body centerline CL.

The control unit 8 is mounted on an outer surface of the bulkhead 53a that forms part of the arm portion 34 by using a plurality of threaded members 58, 58 . . . . The control unit 8 is disposed, in a side view, at a position at which the control unit 8 overlaps part of the two high-voltage batteries 7 . . . .

The bulkhead 53a has a pair of opening portions 61, 61 that face a pair of terminals 59, 60 disposed in each of the high-voltage batteries 7 . . . . The opening portions 61, 61 communicate with each of the first and second accommodating chambers 55, 56. The pair of opening portions 61, 61 is disposed at an upper or lower portion of the bulkhead 53a. In the first embodiment of the present invention, the opening portions 61, 61 are disposed at the lower portion of the bulkhead 53a.

The control unit 8 attached to the bulkhead 53a and a front portion of the arm portion 34 are covered in the front portion cover 38 from an outside. The front portion cover 38 is removably mounted on the arm portion 34 by using a plurality of threaded members 62 . . . .

A lid member 65 that covers the battery accommodating portion 33 from an upward direction is removably attached to the battery accommodating portion 33. Referring to FIG. 2, the lid member 65 has an inner surface 65a that is formed to contact with the high-voltage batteries 7 . . . inside the battery accommodating portion 33 from the upward direction.

The main stand 10 is disposed downwardly of the partition wall 57 and supported rotatably on the bottom wall 54 of the battery accommodating portion 33. The bottom wall 54 of the battery accommodating portion 33 includes a pair of second brackets 66, 66 integrally formed therewith so as to protrude downwardly from a lower surface of the bottom wall 54. The second brackets 66, 66 extend longitudinally to cross the partition wall 57 in a plan view to thereby rotatably support the main stand 10.

The main stand 10 generally includes a stand main unit 67 and a support tube 68. More specifically, the stand main unit 67 is formed by bending a metal round bar. The support tube 68 is fixedly attached to the stand main unit 67.

The stand main unit 67 generally includes a first leg portion 67b, a second leg portion 67d, a connecting portion 67e, and a pedal portion 67f, all integrally formed therewith. More specifically, the first leg portion 67b has a ground contact portion 67a formed on a first end thereof. The second leg portion 67d has a ground contact portion 67c on a first end thereof and is disposed on the right of the first leg portion 67b. The connecting portion 67e is curved so as to connect integrally between second ends of the first leg portion 67b and the second leg portion 67d. The pedal portion 67f is integrally joined to the ground contact portion 67a of the first leg portion 67b so as to allow a rider to hook his or her foot. The support tube 68 is fixedly attached to the connecting portion 67e via a mounting plate 70. Accordingly, the support tube 68 is rotatably connected to the second brackets 66 . . . via a stand shaft 69.

The main stand 10 is rotatably connected to the second brackets 66 . . . such that a line L that passes through a center between the ground contact portions 67a, 67c to extend longitudinally is offset on the right side relative to the vehicle body centerline CL.

Accordingly, the main stand 10 is pivotally supported by the second brackets 66 . . . to be rotatable between a standing or deployed position (the position shown in FIGS. 1 and 2) and a stowed or retracted position (the position shown in FIG. 3). The main stand 10 is urged at all times toward the side of the stowed position by a stand spring 71 disposed between one of the second brackets 66 . . . and the main stand 10. To achieve a parking state by rotating the main stand 10 from the stowed position to the standing position, the rider has only to hook his or her foot at the pedal portion 67f to thereby rotate the main stand 10. When the main stand 10 is rotated into the standing position, the parking state can be achieved, in which the rear wheel WR is grounded, while the front wheel WF stays clear of the ground. The main stand 10 can be rotated upwardly from the standing position to cancel the parking state to thereby bring the main stand 10 into the stowed position.

The bottom wall 54 of the battery accommodating portion 33 further includes a stopper 72 and a pair of left and right support bosses 73, 73 integrally formed therewith. More specifically, the stopper 72 contacts with the main stand 10 in the standing position to thereby maintain the main stand 10 in the standing position. The stopper 72 extends in the vehicle width direction at a position forward of the partition wall 57, so as to protrude downwardly from the lower surface of the bottom wall 54. The support bosses 73 . . . connect the linkage mechanism 18 mentioned earlier. The support bosses 73 . . . protrude downwardly from the lower surface of the bottom wall 54 at positions outside the front portion of the second brackets 66 . . . .

The bottom wall 54 of the battery accommodating portion 33 further integrally provides a plurality of ribs formed on an upper surface thereof to protrude upwardly. The ribs disposed forwardly of the partition wall 57 are more in number than those disposed rearwardly thereof.

More specifically, the ribs are integrally disposed on the bottom wall 54 of the battery accommodating portion 33 in the first and second accommodating chambers 55, 56 as follows. First ribs 74, 74 extend in the vehicle width direction at front portions, respectively, of the first and second accommodating chambers 55, 56. Second ribs 75, 75 extend in the vehicle width direction at rear portions, respectively, of the first and second accommodating chambers 55, 56. Third ribs 78, 78 extend in the vehicle width direction at longitudinal center positions, respectively, of the first and second accommodating chambers 55, 56. Fourth ribs 77, 77 and fifth ribs 76, 76 are disposed at two places spaced apart at some intervals in the vehicle width direction to extend longitudinally so as to be orthogonal to the third ribs 78 . . . and joined on both ends to the first and second ribs 74 . . . , 75 . . . . In addition to the first through fifth ribs 74 to 78, the battery accommodating portion 33 in the first accommodating chamber 55 forward of the partition wall 57 further includes sixth and seventh ribs 79, 80 formed thereon in a protruding condition. The sixth and seventh ribs 79, 80 connect a center in the vehicle width direction of the third rib 78 to connections of the fourth and fifth ribs 77, 76 to the second rib 75, respectively. In contrast, there are only the first through fifth ribs 74 to 78 disposed integrally on the battery accommodating portion 33 in the second accommodating chamber 56 rearward of the partition wall 57.

Effects of the first embodiment of the present invention will be described below. The arrangement in which the electric motor 6, the high-voltage batteries 7 . . . , and the control unit 8 are disposed in the swing arm 9A allows a power unit including the electric motor 6 to be assembled in advance before mounting onto the vehicle body frame F to thereby enhance assemblability. The arrangement also enhances maintainability and achieves simplified wiring. The bulkhead 53a for disposing the high-voltage batteries 7 . . . in isolation from the electric motor 6 and the control unit 8 is integrally formed with the swing arm 9A forwardly of the rear wheel WR. This not only enhances rigidity of the swing arm 9A without having to provide a special member for enhancing rigidity, but also reduces the number of members disposed for supporting the high-voltage batteries 7 . . . . Though the presence of the bulkhead 53a may impede wiring from being simplified, the bulkhead 53a has the pair of opening portions 61 . . . that face the pair of terminals 59 . . . , 60 . . . disposed in each of the high-voltage batteries 7 . . . , so that effect of the bulkhead 53a on simplification of the wiring can be minimized.

The opening portions 61 . . . are disposed at an upper or lower portion of the bulkhead 53a (in the first embodiment of the present invention, the opening portions 61 . . . are disposed at the lower portion of the bulkhead 53a). This minimizes the effect on arranging the very bulkhead 53a or members disposed near the bulkhead 53a.

The swing arm 9A includes the battery accommodating portion 33 disposed forwardly of the rear wheel WR such that the bulkhead 53a forms part of an outer periphery thereof and the arm portion 34 that includes the bulkhead 53a as part of constituent elements thereof and extends from either end portion in the crosswise direction (the left end portion in the first embodiment of the present invention) of the battery accommodating portion 33 to a first side of left and right sides (the left side in the first embodiment of the present invention) of the rear wheel WR. The control unit 8 is mounted on the outer surface of the arm portion 34 that includes the bulkhead 53a as a constituent element thereof, so as to overlap part of the high-voltage batteries 7 . . . in a side view. This helps shorten the distance between the high-voltage batteries 7 . . . and the control unit 8. The front portion cover 38 that covers the arm portion 34 and the control unit 8 mounted on the arm portion 34 from the outside is removably mounted on the arm portion 34. This allows the front portion cover 38 to be removed during servicing without worrying about wiring. With the front portion cover 38 removed, the control unit 8 is exposed to the outside, which further enhances maintainability.

Each of the pair of high-voltage batteries 7 . . . provided in plurality is disposed individually in a corresponding one of the first and second accommodating chambers 55, 56 defined by the partition wall 57 which is integrally formed with the battery accommodating portion 33. While a large amount of electric power is ensured, rigidity of the swing arm 9A can be enhanced by the partition wall 57. In addition, the bulkhead 53a has the opening portions 61 . . . such that the opening portions 61 . . . communicate with each of the first and second accommodating chambers 55, 56. This enhances the ease of routing between the high-voltage batteries 7 . . . and the control unit 8.

The lid member 65 that covers the battery accommodating portion 33 from an upward direction is removably attached to the battery accommodating portion 33 formed to be open upwardly, so as to contact with the high-voltage batteries 7 . . . in the battery accommodating portion 33. This enhances maintainability of the high-voltage batteries 7 . . . , while reducing the number of parts used exclusively for supporting the high-voltage batteries 7 . . . .

The main stand 10 is supported rotatably on the battery accommodating portion 33 in the swing arm 9A. The partition wall 57 that extends in the vehicle width direction so as to divide the battery accommodating portion 33 into the first and second accommodating chambers 55, 56 is integrally formed with the battery accommodating portion 33 and the main stand 10 disposed downwardly of the partition wall 57 is supported rotatably on the bottom wall 54 of the battery accommodating portion 33. This results in the main stand 10 being supported at a portion having rigidity enhanced by the integrally-formed partition wall 57. This eliminates the need for a member dedicated to enhancing rigidity. At the same time, the arrangement inhibits weight of the battery accommodating portion 33 from increasing and enhances stiffness for supporting the main stand 10.

In addition, the pair of second brackets 66 . . . extending longitudinally to cross the partition wall 57 in a plan view is integrally formed with the bottom wall 54 so as to support rotatably the main stand 10 and protrude downwardly from the lower surface of the bottom wall 54. This further enhances rigidity of a portion for rotatably supporting the main stand 10.

The bottom wall 54 of the battery accommodating portion 33 further includes the stopper 72 integrally formed therewith, the stopper 72 contacting with the main stand 10 to thereby maintain the main stand 10 in the standing position. The stopper 72 extends in the vehicle width direction at a position forward of the partition wall 57 so as to protrude downwardly from the lower surface of the bottom wall 54. This further enhances rigidity of the portion for rotatably supporting the main stand 10.

The bottom wall 54 of the battery accommodating portion 33 further integrally provides the plurality of ribs 74 to 80 formed on the upper surface thereof to protrude upwardly. The ribs 74 to 80 disposed forwardly of the partition wall 57 are more in number than those 74 to 78 disposed rearwardly thereof. The increased number of ribs enhances rigidity of only a portion of the bottom wall 54 requiring greater rigidity because of the presence of the stopper 72, so that increased weight more than necessary can be avoided.

The bottom wall 54 of the battery accommodating portion 33 further includes the support bosses 73 . . . integrally formed therewith, the support bosses 73 . . . for removably and vertically swingably supporting the swing arm 9A on the vehicle body frame F via the linkage mechanism 18. The support bosses 73 . . . protrude downwardly from the lower surface of the bottom wall 54. This further enhances rigidity of the portion for rotatably supporting the main stand 10.

Whereas the electric motor 6 is disposed on a first crosswise side Ls of the arm portion 34, and on a first crosswire side L of the vehicle body centerline CL extending longitudinally, the pair of high-voltage batteries 7 . . . accommodated in the battery accommodating portion 33 have the center-of-gravity positions G1, G2 that are disposed on a second crosswise side L of the vehicle body centerline CL. Disposing the heavy electric motor 6 and the center-of-gravity positions G1, G2 of the pair of heavy high-voltage batteries 7 . . . at different locations helps achieve a good crosswise weight balance.

Figure 4:
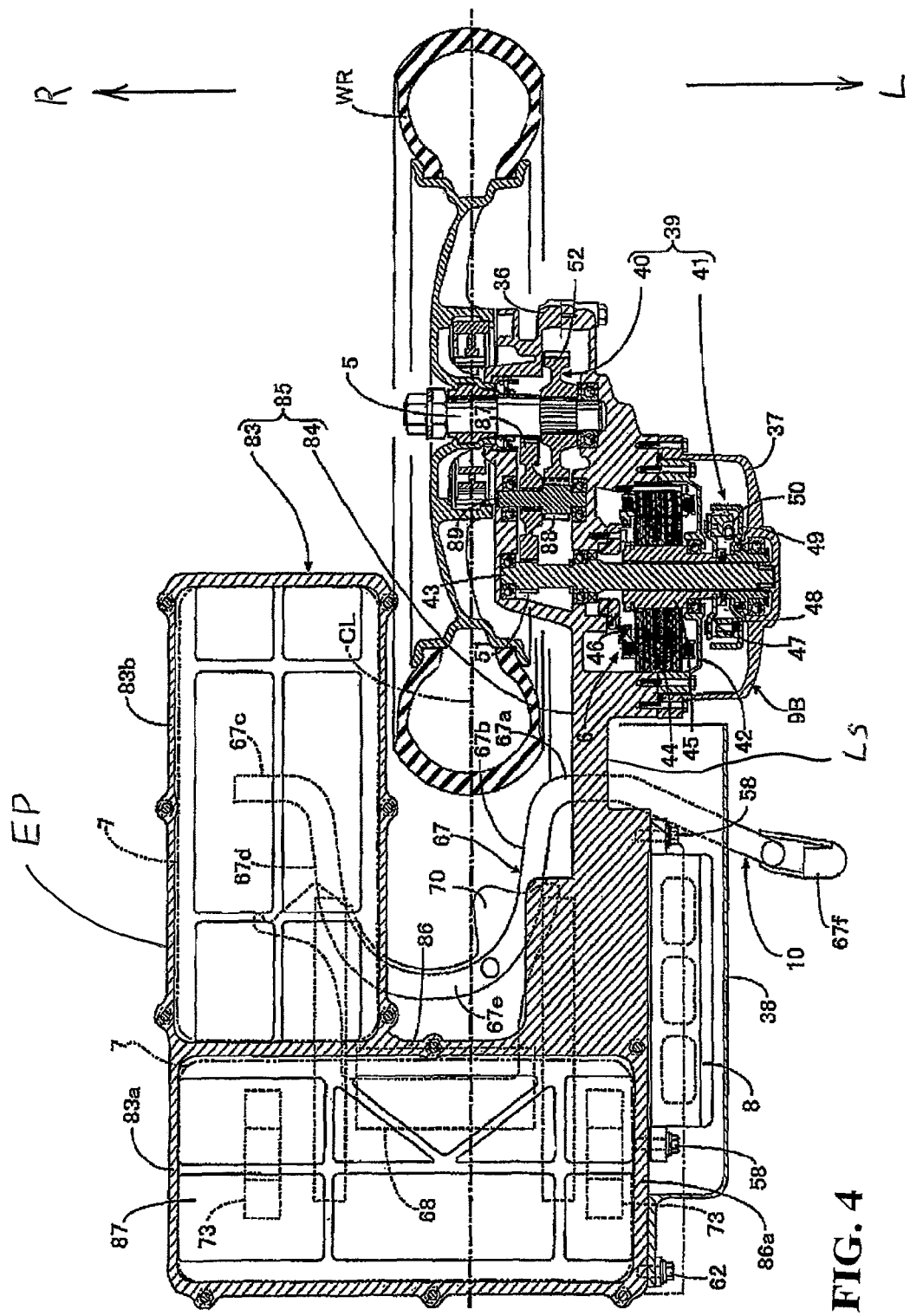
FIG. 4 is a cross-sectional view showing a second embodiment of the present invention, corresponding to FIG. 3.

A second embodiment of the present invention will be described below with reference to FIG. 4. Like or corresponding parts are identified by the same reference numerals as those used for the first embodiment of the present invention and descriptions for those parts will be omitted.

A swing arm 9B generally includes a swing arm main unit 85, a gear case 36, a rear portion cover 37, and a front portion cover 38. More specifically, the swing arm main unit 85 includes a battery accommodating portion 83 for accommodating a pair of batteries 7 . . . and an arm portion 84 that extends from either end portion in the crosswise direction of the battery accommodating portion 83 to a first side of left and right sides of the rear wheel WR. The gear case 36 is connected to a rear portion of the arm portion 84 from the side of the rear wheel WR. The rear portion cover 37 is connected to the rear portion of the arm portion 84 from a side opposite to the rear wheel WR. The front portion cover 38 is removably connected to a front portion of the arm portion 84 forwardly of the rear portion cover 37 from a side opposite to the battery accommodating portion 83. In the second embodiment of the present invention, the arm portion 84 extends from a left end portion of the battery accommodating portion 83 to a left side of the rear wheel WR.

An axle 5 of the rear wheel WR is rotatably supported on the rear portion of the swing arm 9B. In addition, an electric motor 6 and a power transmission means 39 are housed in the rear portion of the swing arm 9B.

The battery accommodating portion 83 generally includes a first accommodating portion 83a, a second accommodating portion 83b, a side wall 86, and a bottom wall 87. More specifically, the first accommodating portion 83a is disposed forwardly of the rear wheel WR. The second accommodating portion 83b is joined to a right side of the first accommodating portion 83a so as to be disposed on the right of a front portion of the rear wheel WR. The side wall 86 is formed substantially into an L shape so as to form an outer periphery of the first accommodating portion 83a and the second accommodating portion 83b. The bottom wall 87 is integrally formed in a connected row arrangement with a lower portion of the side wall 86.

The first accommodating portion 83a accommodates a first high-voltage battery 7 extending along the vehicle width direction and the second accommodating portion 83b accommodates a second high-voltage battery 7 extending along the longitudinal direction of the vehicle.

Of the side wall 86, a portion constituting a left side wall of the first accommodating portion 83a functions as a bulkhead 86a for disposing one high-voltage battery 7 in isolation from an electric motor 6 and a control unit 8. The bulkhead 86a is integrally formed with the swing arm 9B forwardly of the rear wheel WR. The arm portion 84 extends rearwardly from the battery accommodating portion 83, having the bulkhead 86a as a constituent element thereof.

Whereas the electric motor 6 is disposed on a first crosswise side Ls of the arm portion 84 (the left side according to the second embodiment of the present invention), and on first crosswire side L of the vehicle body centerline CL extending longitudinally, the second high-voltage battery 7 accommodated along the vehicle longitudinal direction in the second accommodating portion 83b of the battery accommodating portion 83 is disposed on a second crosswise side R (the right side according to the second embodiment of the present invention) of the vehicle body centerline CL and part of the second high-voltage battery 7 disposed on the second crosswise side R of the vehicle body centerline CL is disposed sideways the rear wheel WR.

The control unit 8 is mounted on an outer surface of the arm portion 84 that includes the bulkhead 86a as a constituent element thereof by using a plurality of threaded members 58, 58 . . . . The control unit 8 is disposed, in a side view, at a position at which the control unit 8 overlaps part of the high-voltage batteries 7 . . . and covered in the front portion cover 38.

The bulkhead 86a has an opening portion formed in an upper or lower portion thereof, the opening portion facing a pair of terminals 59, 60 disposed in the first high-voltage battery 7 accommodated in the first accommodating portion 83a.

In the second embodiment of the present invention, too, the bulkhead 86a for disposing the high-voltage batteries 7 . . . in isolation from the electric motor 6 and the control unit 8 is integrally formed with the swing arm 9B forwardly of the rear wheel WR. This not only enhances rigidity of the swing arm 9B without having to provide a special member for enhancing rigidity, but also reduces the number of members disposed for supporting the high-voltage batteries 7 . . . . Though the presence of the bulkhead 86a may impede wiring from being simplified, the bulkhead 86a has the opening portion that faces the pair of terminals 59, 60 disposed in each of the high-voltage batteries 7 . . . , so that effect of the bulkhead 86a on simplification of the wiring can be minimized.

The control unit 8 is mounted on the outer surface of the arm portion 84 that includes the bulkhead 86a as a constituent element thereof, so as to overlap part of the high-voltage batteries 7 . . . in a side view. This helps shorten the distance between the high-voltage batteries 7 . . . and the control unit 8. The front portion cover 38 that covers the arm portion 84 and the control unit 8 mounted on the arm portion 84 from the outside is removably mounted on the arm portion 84. This allows the front portion cover 38 to be removed during servicing without worrying about wiring. With the front portion cover 38 removed, the control unit 8 is exposed to the outside, which further enhances maintainability.

Each of the plurality of pairs of high-voltage batteries 7 . . . is disposed individually in a corresponding one of the first and second accommodating chambers 83a, 83b included in the battery accommodating portion 83. A large amount of electric power can therefore be ensured.

The electric motor 6 is disposed on a first crosswise side Ls of the arm portion 84 (the left side according to the second embodiment of the present invention), and on a first crosswire side L of the vehicle body centerline CL extending longitudinally and the second high-voltage battery 7 accommodated along the vehicle longitudinal direction in the second accommodating portion 83b of the battery accommodating portion 83 is disposed on a second crosswise side R of the vehicle body centerline CL. Disposing the heavy electric motor 6 and the high-voltage battery 7 at different locations across the vehicle body centerline CL helps achieve a good crosswise weight balance. Moreover, part of the second high-voltage battery 7 disposed on the second crosswise side R of the vehicle body centerline CL is disposed sideways of the rear wheel WR. This eliminates the need for disposing the rear wheel WR further rearwardly in order to avoid interference with the high-voltage battery 7. This helps avoid a long longitudinal length of the electric motorcycle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle riding, electric vehicle comprising:
a swing arm removably and vertically swingably supported on a vehicle body frame;
an electric motor, disposed on the swing arm, for generating drive power for rotatably driving a rear wheel rotatably supported at a rear portion of the swing arm;
a battery, disposed on the swing arm, for supplying the electric motor with electric power; and
a control unit, disposed on the swing arm, for controlling the electric motor;
wherein: the swing arm integrally provides, forwardly of the rear wheel, a bulkhead for disposing the battery in isolation from the electric motor and the control unit; and the bulkhead has an opening portion facing terminals disposed in the battery,
the swing arm further including:
a battery accommodating portion having the bulkhead forming part of an outer periphery thereof; and
an arm portion having the bulkhead as part of constituent elements thereof,
the arm portion extending from a first crosswise end portion EP of the battery accommodating portion and to a first crosswise side Ls of the arm portion disposed further leftwardly with respect to the rear wheel;

the control unit is disposed on an outer surface of the arm portion so as to overlap part of the battery in a side view; and the arm portion is removably fitted with a cover member for covering from an outside the arm portion and the control unit disposed on the arm portion.

2. The saddle riding, electric vehicle according to claim 1, wherein the opening portion is disposed on an upper portion or a lower portion of the bulkhead.

3. The saddle riding, electric vehicle according to claim 1, wherein:

the battery includes a plurality of batteries, each being disposed individually in a corresponding one of a plurality of accommodating chambers defined by a partition wall integrally formed with the battery accommodating portion; and the bulkhead has the opening portion such that the opening portion communicates individually with each of the accommodating chambers.

4. The saddle riding, electric vehicle according to claim 2, wherein:

the battery includes a plurality of batteries, each being disposed individually in a corresponding one of a plurality of accommodating chambers defined by a partition wall integrally formed with the battery accommodating portion; and the bulkhead has the opening portion such that the opening portion communicates individually with each of the accommodating chambers.

5. The saddle riding, electric vehicle according to claim 1, wherein the battery accommodating portion formed to be open upwardly is removably fitted with a lid member for covering the battery accommodating portion from an upward direction so as to contact with the battery in the battery accommodating portion.

6. The saddle riding, electric vehicle according to claim 3, wherein the battery accommodating portion formed to be open upwardly is removably fitted with a lid member for covering the battery accommodating portion from an upward direction so as to contact with the plurality of batteries in the battery accommodating portion.

7. The saddle riding, electric vehicle according to claim 4, wherein the battery accommodating portion formed to be open upwardly is removably fitted with a lid member for covering the battery accommodating portion from an upward direction so as to contact with the plurality of batteries in the battery accommodating portion.

8. The saddle riding, electric vehicle according to claim 1, wherein:

the electric motor is disposed on the first crosswise side Ls of the arm portion and a first crosswise side L of vehicle body centerline CL extending longitudinally; and the battery is disposed on a second crosswise side R of the vehicle body centerline CL such that a part of the battery extends further rightwardly with respect to the rear wheel.

9. The saddle riding, electric vehicle according to claim 1, wherein the battery includes a plurality of batteries, and the battery accommodating portion is integrally providing a partition wall extending in a vehicle width direction so as to form a plurality of accommodating chambers, each accommodating individually a corresponding one of the plurality of batteries;

the saddle riding, electric vehicle further comprising:

a stand being disposed downwardly with respect to the partition wall, and being supported rotatably on a bottom wall of the battery accommodating portion.

10. The saddle riding, electric vehicle according to claim 9, wherein the bottom wall of the battery accommodating portion further includes a bracket integrally formed therewith so as to protrude downwardly from a lower surface of the bottom wall, the bracket extending longitudinally to cross the partition wall in a plan view for rotatably supporting the stand.

11. The saddle riding, electric vehicle according to claim 9, wherein the bottom wall of the battery accommodating portion further includes:

a stopper integrally formed therewith, the stopper contacting with the stand to thereby maintain the stand in a standing position and extending in the vehicle width direction at a position forward of the partition wall so as to protrude downwardly from the lower surface of the bottom wall.

12. The saddle riding, electric vehicle according to claim 10, wherein the bottom wall of the battery accommodating portion further includes:

a stopper integrally formed therewith, the stopper contacting with the stand to thereby maintain the stand in a standing position and extending in the vehicle width direction at a position forward of the partition wall so as to protrude downwardly from the lower surface of the bottom wall.

13. The saddle riding, electric vehicle according to claim 11, wherein the bottom wall of the battery accommodating portion further includes:

a plurality of ribs integrally formed on an upper surface thereof to protrude upwardly, the ribs disposed forwardly of the partition wall being more in number than the ribs disposed rearwardly thereof.

14. The saddle riding, electric vehicle according to claim 9, wherein the bottom wall of the battery accommodating portion further includes:

a support boss integrally formed therewith, the support boss for removably and vertically swingably supporting the swing arm on the vehicle body frame via a linkage mechanism, the support boss protruding downwardly from the lower surface of the bottom wall.

15. The saddle riding, electric vehicle according to claim 10, wherein the bottom wall of the battery accommodating portion further includes:

a support boss integrally formed therewith, the support boss for removably and vertically swingably supporting the swing arm on the vehicle body frame via a linkage mechanism, the support boss protruding downwardly from the lower surface of the bottom wall.

16. The saddle riding, electric vehicle according to claim 11, wherein the bottom wall of the battery accommodating portion further includes:

a support boss integrally formed therewith, the support boss for removably and vertically swingably supporting the swing arm on the vehicle body frame via a linkage mechanism, the support boss protruding downwardly from the lower surface of the bottom wall.

17. The saddle riding, electric vehicle according to claim 1, wherein the electric motor is disposed leftwardly with respect to vehicle body centerline CL extending longitudinally, and the plurality of batteries accommodated in the battery accommodating portion have individual center-of-gravity positions G1 G2 disposed on a second crosswise side R of the vehicle body centerline CL.

18. The saddle riding, electric vehicle according to claim 2, wherein the electric motor is disposed leftwardly with respect to vehicle body centerline CL extending longitudinally, and the plurality of batteries accommodated in the battery accommodating portion have individual center-of-gravity positions G1, G2 disposed on a second crosswise side R of the vehicle body centerline.

* * * * *